US012661581B2

(12) United States Patent
Yu et al.

(10) Patent No.: US 12,661,581 B2
(45) Date of Patent: Jun. 23, 2026

(54) JOYSTICK MECHANISM AND GAMEPAD

(71) Applicant: SHENZHEN GULI TECHNOLOGY CO., LTD., Shenzhen (CN)

(72) Inventors: Hongyong Yu, Shenzhen (CN); Jingzhuo Huang, Shenzhen (CN)

(73) Assignee: SHENZHEN GULI TECHNOLOGY CO., LTD., Shenzhen (CN)

( * ) Notice: Subject to any disclaimer, the term of this patent is extended or adjusted under 35 U.S.C. 154(b) by 292 days.

(21) Appl. No.: 18/427,759

(22) Filed: Jan. 30, 2024

(65) Prior Publication Data

US 2025/0128151 A1    Apr. 24, 2025

Related U.S. Application Data

(63) Continuation of application No. PCT/CN2023/127696, filed on Oct. 30, 2023.

(30) Foreign Application Priority Data

Oct. 20, 2023    (CN) .......................... 202322843882.5

(51) Int. Cl.
*A63F 13/24* (2014.01)
(52) U.S. Cl.
CPC .................................... *A63F 13/24* (2014.09)

(58) Field of Classification Search
CPC .................................. A63F 13/24; G05G 1/04
See application file for complete search history.

(56) References Cited

U.S. PATENT DOCUMENTS

| | | | | |
|---|---|---|---|---|
| 11,366,485 B1* | 6/2022 | Domzalski | ............... | G05G 5/08 |
| 11,669,122 B2* | 6/2023 | Zeng | ...................... | G05G 9/047 |
| | | | | 345/161 |
| 11,815,931 B2* | 11/2023 | Zeng | ...................... | G01D 5/145 |
| 11,862,414 B1* | 1/2024 | Zeng | ...................... | H01H 23/28 |
| 2023/0324945 A1* | 10/2023 | Zeng | ...................... | G05G 9/047 |

* cited by examiner

*Primary Examiner* — Peter J Iannuzzi
(74) *Attorney, Agent, or Firm* — Hemisphere Law, PLLC

(57) ABSTRACT

A joystick mechanism and a game pad are provided. The joystick mechanism includes a mounting base, a circuit board, a first rocker assembly, and a second rocker assembly. The circuit board is disposed in the mounting base, and the circuit board includes a first sensor and a second sensor. The first rocker assembly includes a first rocker and a first sensing component, and the first rocker assembly is capable of swinging around a first direction to drive the first sensing component to swing with respect to the first sensor. The second rocker assembly includes a second rocker and a second sensing component, the second rocker assembly is capable of swinging around a second direction to drive the second sensing component to swing with respect to the second sensor, the second direction is perpendicular to the first direction.

8 Claims, 4 Drawing Sheets

JOYSTICK MECHANISM AND GAMEPAD

CROSS REFERENCE

The present application is a continuation-application of International (PCT) Patent Application No. PCT/CN 2023/127696 filed on Oct. 30, 2023, which claims foreign priority of Chinese Patent Application No. 202322843882.5, filed on Oct. 20, 2023, the entire contents of which are hereby incorporated by reference.

TECHNICAL FIELD

The present disclosure relates to a technical field of gamepads, and in particular to a joystick mechanism and a gamepad.

BACKGROUND

Gamepads are a common accessory for electronic gaming devices, which control virtual characters through operating components therein, such as a joystick, a button, etc. by users.

In the prior art, for example, as disclosed in Chinese patent No. CN218240764U, a multi-directional joystick drives a first swinging assembly to swing around a second direction through a main shaft and drives a first magnetic component of a first sensing assembly to move with respect to a first sensor through the main shaft, so as to generate a first control signal, the main shaft further drives a second swinging assembly to swing around a first direction and drives a second magnetic component of a second sensing assembly to move with respect to a second sensor to further generate a second control signal. In this way, in order to ensure control precision and control sensitivity, there is a high requirement required for assembling the first swinging assembly and the first magnetic component and assembling the second swinging assembly and the second magnetic component, and there is also a high requirement required for machining precision of parts and components, as such, a product yield is reduced.

SUMMARY

Embodiments of the present disclosure provide a joystick mechanism and a game controller to simplify a structure of the joystick mechanism and improve a product yield of the gamepad.

The joystick mechanism is provided, including a mounting base, a circuit board, a first rocker assembly, and a second rocker assembly. The circuit board is disposed in the mounting base, and the circuit board includes a first sensor and a second sensor. The first rocker assembly includes a first rocker and a first sensing component, the first rocker is disposed in the mounting base, the first sensing component is connected to the first rocker and is disposed corresponding to the first sensor, and the first rocker assembly is capable of swinging around a first direction to drive the first sensing component to swing with respect to the first sensor. The second rocker assembly includes a second rocker and a second sensing component, the second rocker is disposed in the mounting base, the second sensing component is connected to the second rocker and is disposed corresponding to the second sensor, the second rocker assembly is capable of swinging around a second direction to drive the second sensing component to swing with respect to the second sensor, the second direction is perpendicular to the first direction.

In one embodiment, the joystick mechanism further includes a main shaft disposed in the mounting base. The first rocker passes through the main shaft and is rotatably engaged in the main shaft in the second direction, the second rocker is sleeved on the main shaft, the main shaft is configured to drive the first rocker and the second rocker to swing.

In one embodiment, the main shaft defines a first limiting groove along the first direction and defines a second limiting groove along the second direction. The first rocker includes a limiting portion, a first extending portion, a second extending portion, a first rotating shaft, and a second rotating shaft. The limiting portion, the first extending portion, the second extending portion, the first rotating shaft, and the second rotating shaft are integrally formed, the first extending portion and the second extending portion are respectively connected to two opposite ends of the limiting portion along the first direction, the first rotating shaft and the second rotating shaft are respectively connected to another two opposite ends of the limiting portion along the second direction. The first rotating shaft and the second rotating shaft are respectively rotatably engaged in the second limiting groove in the second direction, the limiting portion passes through the first limiting groove and is driven by the main shaft to swing around the first direction. The first sensing component is connected to an end, away from the limiting portion, of the first extending portion.

In one embodiment, the first extending portion includes a shaft portion, a supporting plate, and a first mounting portion, the shaft portion is connected to the limiting portion, the supporting plate is located between the shaft portion and the first mounting portion, the first mounting portion defines a first mounting groove for accommodating the first sensing component, and the first mounting portion is disposed corresponding to the first sensing component. The main shaft is capable of abutting the supporting plate against the circuit board after being pressed to limit a swing range of the first rocker.

In one embodiment, the second rocker includes a main body, a first supporting portion, a second supporting portion, and a second mounting portion. The main body, the first supporting portion, the second supporting portion, and the second mounting portion are integrally formed. The first supporting portion and the second supporting portion are respectively connected to two opposite ends of the main body along the second direction, the second mounting portion is connected to an end, away from the main body, of the second supporting portion, and is disposed corresponding to the second sensor, the main body is sleeved on the main shaft, and the main shaft drives the main body to swing, so as to drive the second mounting portion to swing with respect to the second sensor. The second mounting portion defines a second mounting groove for accommodating the second sensing component.

In one embodiment, the main body defines a through hole for the main shaft to pass through, and the through hole forms two notches for limiting the main shaft in the second direction.

In one embodiment, the main body includes a spherical fitting surface, the spherical fitting surface is located at a side, facing away from the first rocker, of the main body. The mounting base defines a spherical groove, and the spherical fitting surface is slidably engaged in the spherical groove.

In one embodiment, the mounting base includes an upper housing and a lower housing, protrusions are disposed on peripheral sides of one of the upper housing and the lower housing, and clamping grooves are defined on another one of the upper housing and the lower housing, the protrusions are respectively clamped in the clamping grooves.

In one embodiment, the rocker mechanism includes a reset component, the reset component is disposed in the mounting base, the first rocker and the second rocker respectively abut against the reset component.

A gamepad including an outer housing and a joystick mechanism as foregoing is further provided. The joystick mechanism is connected to the outer housing.

The joystick mechanism is applied to the gamepad, the joystick mechanism includes the mounting base, the circuit board, the first rocker assembly, and the second rocker assembly. The circuit board is disposed in the mounting base, and the circuit board includes the first sensor and the second sensor. The first rocker assembly includes the first rocker and the first sensing component, the first rocker is disposed in the mounting base, the first sensing component is connected to the first rocker and is disposed corresponding to the first sensor, and the first rocker assembly is capable of swinging around the first direction to drive the first sensing component to swing with respect to the first sensor. The second rocker assembly includes the second rocker and the second sensing component, the second rocker is disposed in the mounting base, the second sensing component is connected to the second rocker and is disposed corresponding to the second sensor, the second rocker assembly is capable of swinging around the second direction to drive the second sensing component to swing with respect to the second sensor, the second direction is perpendicular to the first direction. The first sensing component is directly connected to the first rocker and is driven by the first rocker to swing with respect to the first sensor, the second sensing component is directly connected to the second rocker and being driven by the second rocker to swing with respect to the second sensor, there is no intermediate component required for both connection between the first sensing component and the first rocker and connection between the second sensing component and the second rocker, so that an intermediate link of assembling the first sensing component and the first rocker and an intermediate link of assembling the second sensing component and the second rocker are simplified, and positioning accuracy and a product yield thereof are further improved.

BRIEF DESCRIPTION OF DRAWINGS

In order to more clearly illustrate embodiments of the present disclosure or technical solutions in the prior art, drawings that need to be used in the embodiments or the prior art are briefly described below, and it is obvious that accompanying drawings in following description are merely some embodiments of the present disclosure, and those who skilled in the art may obtain other drawings according to these drawings without involving any inventive effort.

REFERENCE NUMERALS IN THE DRAWINGS

10. joystick mechanism; 100. mounting base; 110. upper housing; 111. protrusion; 120. lower housing; 121. clamping groove; 200. circuit board; 210. first sensor; 220. second sensor; 300. first rocker assembly; 310. first rocker; 311. limiting portion; 312. first extending portion; 3121. shaft portion; 3123. supporting plate; 3125. first mounting portion; 3126. first mounting groove; 313. second extending portion; 314. first rotating shaft; 315. second rotating shaft; 320. first sensing component; 400. second rocker assembly; 410. second rocker; 411. main body; 411a. through hole; 411b. notch; 411c. spherical fitting surface; 413. first supporting portion; 415. second supporting portion; 417. second mounting portion; 418. second mounting groove; 420. second sensing component; 500. main shaft; 501. first limiting groove; 503. second limiting groove; 610. rod cap; 700. reset component.

DETAILED DESCRIPTION

In order to facilitate understanding of the present disclosure, the present disclosure is described more fully hereinafter with reference to accompanying drawings. Preferred embodiments of the present disclosure are given in the accompanying drawings. However, the present disclosure may be implemented in many different forms and is not limited to embodiments described herein. On the contrary, a purpose of providing these embodiments is to make the understanding of a content of the present disclosure more thorough and comprehensive.

It should be noted that when an element is referred to as being "fixed to" another element, it may be directly on another element or intermediate elements may also be provided. When an element is considered to be "connected to" another element, it may be directly connected to another element or intermediate elements may also be provided. Terms "vertical", "horizontal", "left", "right", etc. used herein are for illustrative purposes only.

Unless otherwise defined, all technical and scientific terms used herein have the same meaning as commonly understood by those who skilled in the art of the present disclosure. A terminology used herein in the specification of the present disclosure is for a purpose of describing particular embodiments only and is not intended to limit the present disclosure. As used herein, a term "and/or" includes any and all combinations of one or more of associated listed items.

Figure 1:
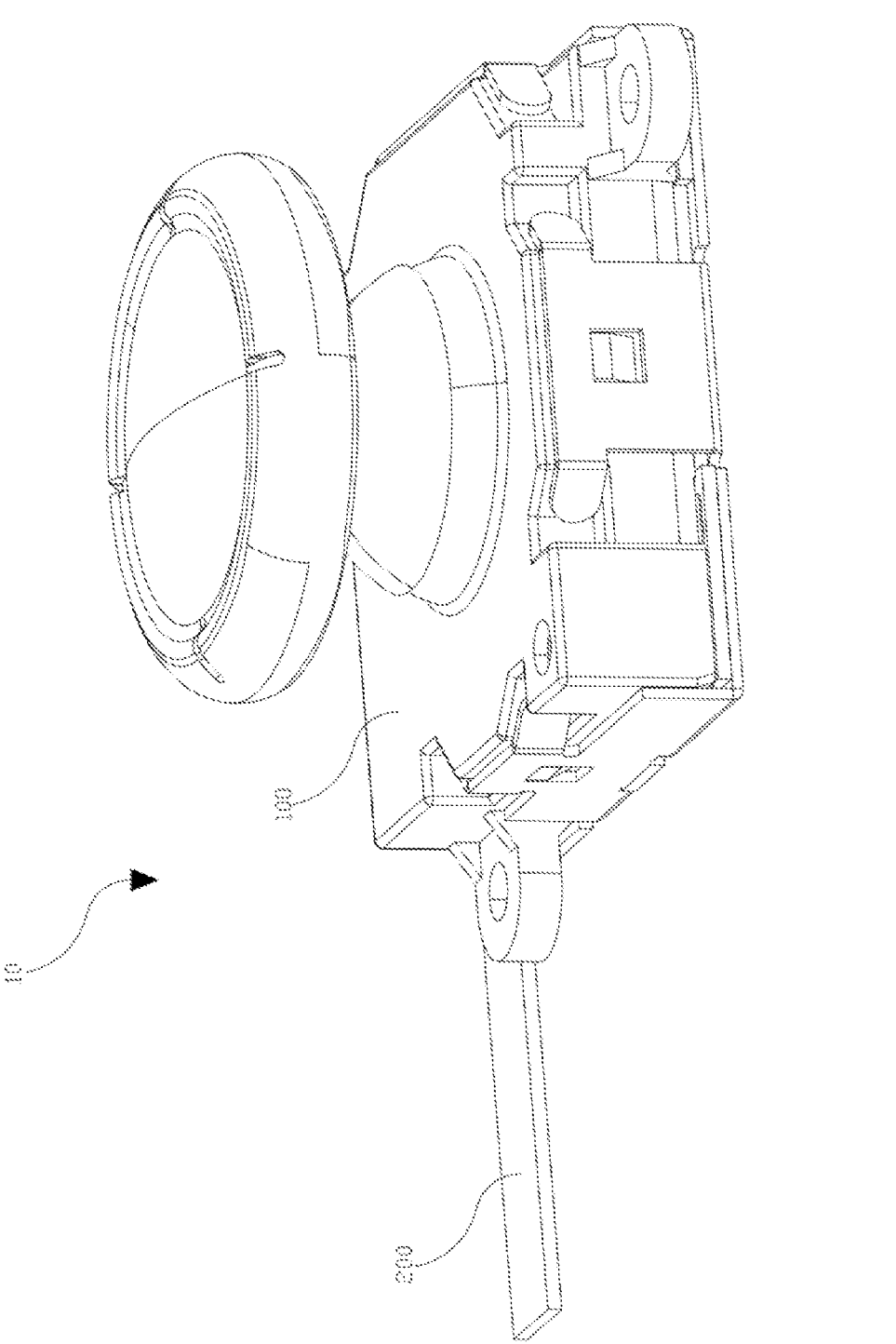
FIG. 1 is a schematic diagram of a joystick mechanism according to one embodiment of the present disclosure.

Please refer to FIG. 1, the present disclosure provides a joystick mechanism 10, the joystick mechanism 10 is capable of connecting to an outer housing (not shown in the drawings) of a gamepad, virtual characters may be controlled through operating the joystick mechanism 10 and components of the gamepad, such as a button, by an operator.

Figure 2:
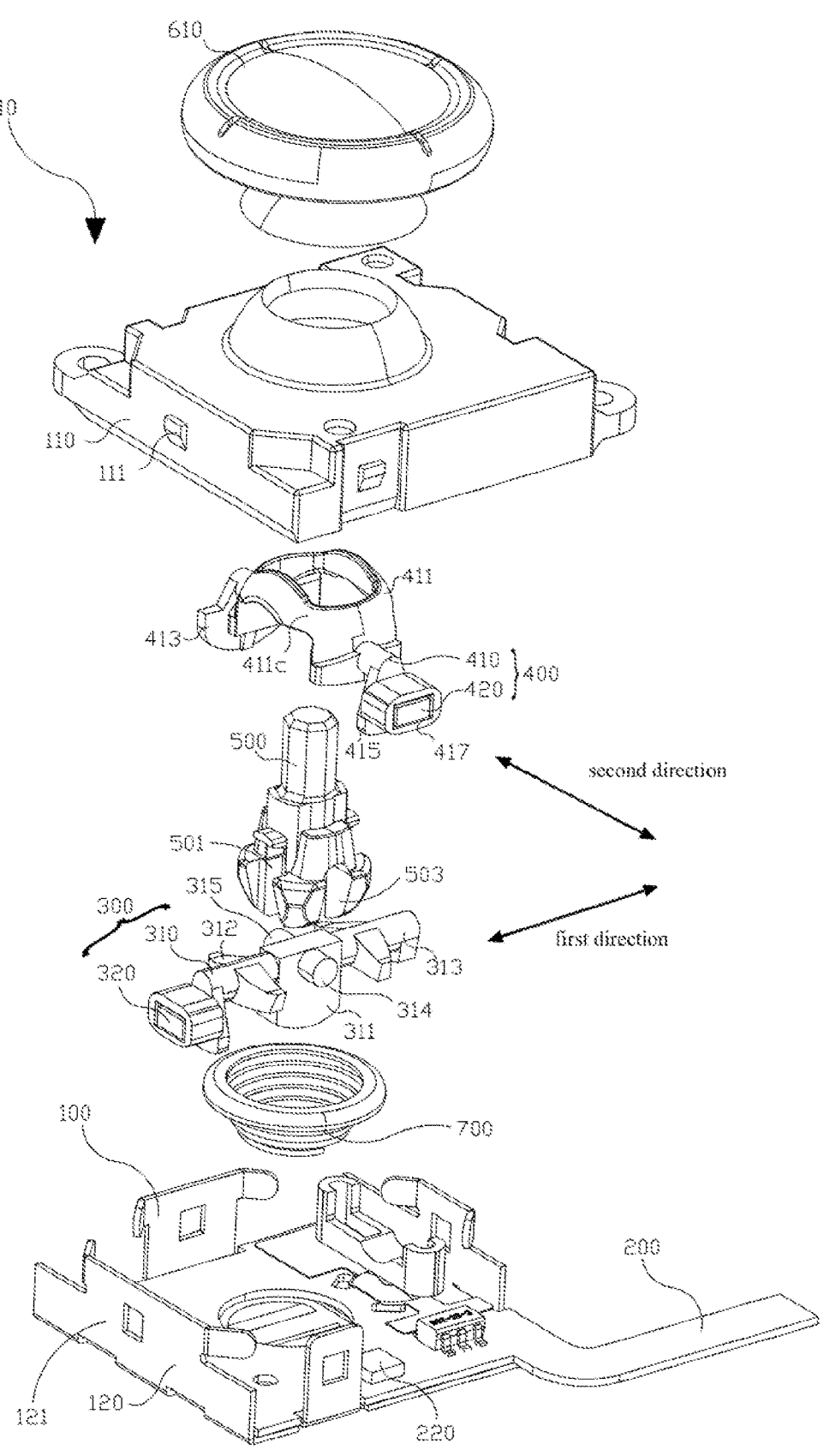
FIG. 2 is an exploded schematic diagram of the joystick mechanism shown in FIG. 1.
Figure 3:
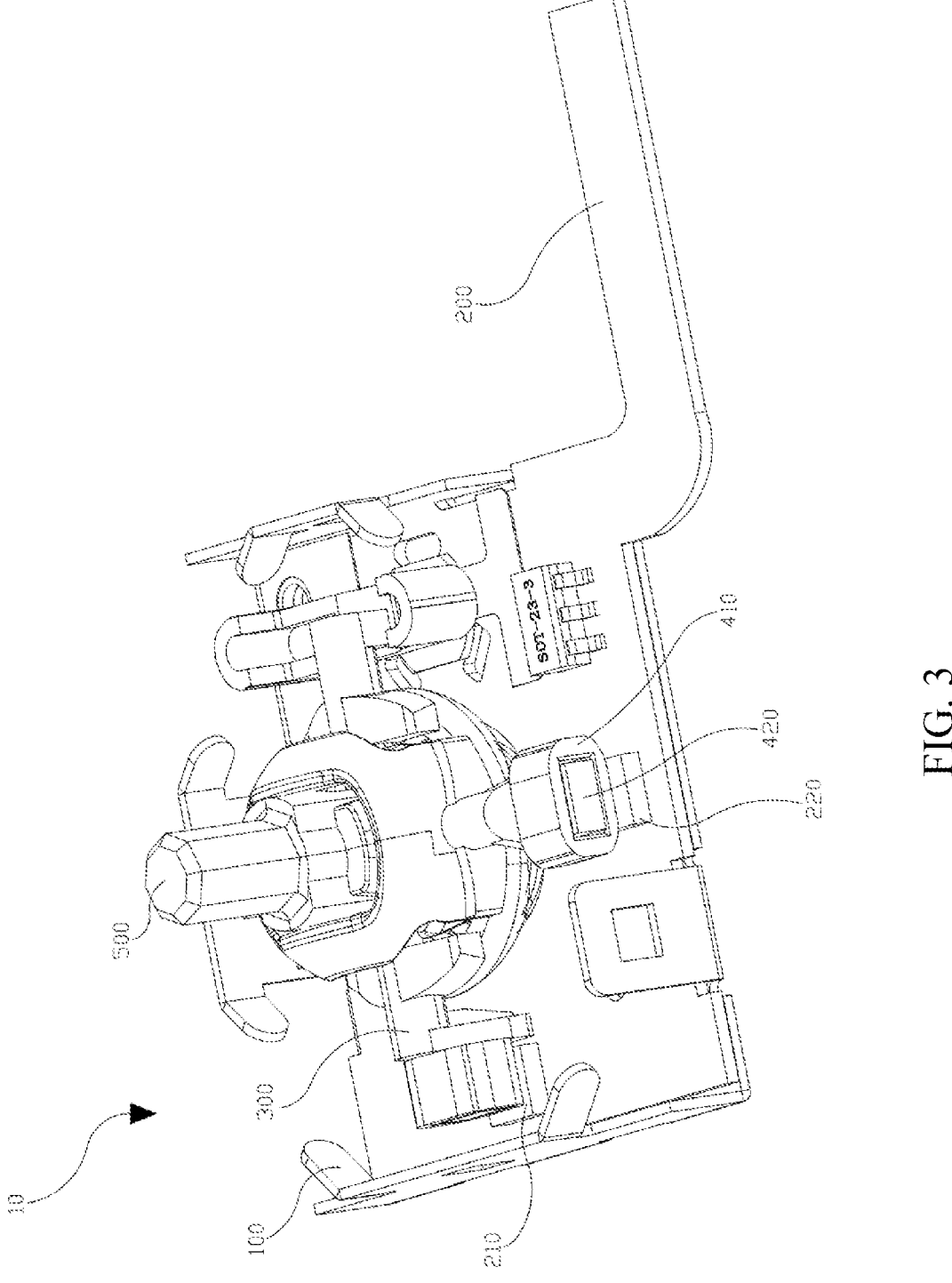
FIG. 3 is a schematic diagram of the joystick mechanism shown in FIG. 1 removing partial structures.

Please further refer to FIGS. 2-3, the joystick mechanism 10 includes a mounting base 100, a circuit board 200, a first rocker assembly 300, and a second rocker assembly 400. The circuit board 200 is disposed in the mounting base 100, and the circuit board 200 includes a first sensor 210 and a second sensor 220. The circuit board 200 integrates a necessary control circuit and is electrically connected to a main board of the gamepad through a leading-out wire. The first rocker assembly 300 includes a first rocker 310 and a first sensing component 320, the first rocker 310 is disposed in the mounting base 100, the first sensing component 320 is connected to the first rocker 310 and is disposed corresponding to the first sensor 210, and the first rocker assembly 300 is capable of swinging around a first direction to drive the first sensing component 320 to swing with respect to the first sensor 210. The second rocker assembly 400 includes a second rocker 410 and a second sensing component 420, the second rocker 410 is disposed in the mounting base 100, the second sensing component 420 is connected to the second rocker 410 and is disposed corresponding to the second sensor 220, the second rocker assembly 400 is capable of swinging around a second direction to drive the second sensing component 420 to swing with respect to the second sensor 220, the second direction is perpendicular to the first direction.

The joystick mechanism 10 further includes a main shaft 500 disposed in the mounting base 100. The first rocker 310 passes through the main shaft 500 and is rotatably engaged in the main shaft 500 in the second direction, the second rocker 410 is sleeved on the main shaft 500, the main shaft 500 is configured to drive the first rocker 310 and the second rocker 410 to swing.

In some embodiments, the first sensing component 320 and the second sensing component 420 are magnets, the first sensor 210 and the second sensor 220 are Hall sensors, when the first rocker 310 drives the first sensing component 320 to swing with respect to the first sensor 210, a magnetic field of the first sensing component 320 changes therewith, and one of the Hall sensors corresponding to the first sensing component 320 generates a first control signal in response to a change in the magnetic field of the first sensing component 320, thereby succeeding in controlling operations. Similarly, when the second rocker 410 drives the second sensing component 420 to swing with respect to the first sensor 210, a magnetic field of the second sensing component 420 changes therewith, and another one of the Hall sensors corresponding to the second sensing component 420 generates a second control signal in response to a change in the magnetic field of the second sensing component 420, thereby succeeding in controlling operations.

Please further refer to FIG. 2, a first end of the main shaft 500 extends out of the mounting base 100, the joystick mechanism 10 includes a rod cap 610, the rod cap 610 is in a disc shape and is connected to the first end of the main shaft 500 extending out of the mounting base 100. The rod cap 610 is configured to increase a contact area with a hand, which is convenient for users to operate the joystick mechanism 10.

At a second end of the main shaft 500 away from the rod cap 610, the main shaft 500 defines a first limiting groove 501 along the first direction and defines a second limiting groove 503 along the second direction. The first rocker 310 includes a limiting portion 311, a first extending portion 312, a second extending portion 313, a first rotating shaft 314, and a second rotating shaft 315. The limiting portion 311, the first extending portion 312, the second extending portion 313, the first rotating shaft 314, and the second rotating shaft 315 are integrally formed, the limiting portion 311 is generally in a shape of rectangular block, the first extending portion 312 and the second extending portion 313 are respectively connected to two opposite ends of the limiting portion 311 along the first direction, the first rotating shaft 314 and the second rotating shaft 315 are respectively connected to another two opposite ends of the limiting portion 311 along the second direction. The first rotating shaft 314 and the second rotating shaft 315 are respectively rotatably engaged in the second limiting groove 503 in the second direction, the limiting portion 311 passes through the first limiting groove 501 and is driven by the main shaft 500 to swing around the first direction.

The first sensing component 320 is connected to an end, away from the limiting portion, of the first extending portion. Specifically, in an axial direction of the main shaft 500, the first limiting groove 501 defines a first limiting space for the main shaft 500 to swing around the second direction with respect to the first rocker 310, however, in the second direction, gaps between two opposite sides of the limiting portion 311 an groove wall of the first limiting groove 501 are extremely small, for example, the two opposite sides of the limiting portion 311 are in clearance fit with the groove wall of the first limiting groove 501, thereby limiting the limiting portion 311 to swing around the first direction with respect to the main shaft 500, so that the main shaft 500 and the limiting portion 311 drive the first rocker 310 to swing around the first direction.

In a process of operating the gamepad by the users, when a direction of a torque applied to the limiting portion 311 through the rod cap 610 and the main shaft 500 is along the first direction, the first rocker 310 is driven to swing around the first direction, so as to drive the first sensing component 320 to synchronously swing around the first direction to move with respect to the first sensor 210 to generate control signals in the first direction. When the direction of the torque applied to the limiting portion 311 through the rod cap 610 and the main shaft 500 is along the second direction, the main shaft 500 rotates around the second direction with respect to the first rotating shaft 314 and the second rotating shaft 315, the first limiting groove 501 defines the first limiting space, and at this time, the first sensing component 320 and the first sensor 210 remain relatively stationary, so that there is no control signal generated in the first direction.

The first sensing component 320 is connected to the end, away from the limiting portion 311, of the first extending portion 312. Specifically, please further refer to FIG. 4, the first extending portion 312 includes a shaft portion 3121, a supporting plate 3123, and a first mounting portion 3125, the shaft portion 3121 is connected to the limiting portion 311, the supporting plate 3123 is located between the shaft portion 3121 and the first mounting portion 3125, the first mounting portion 3125 defines a first mounting groove 3126 for accommodating the first sensing component 320, the first mounting portion 3125 forms a semi-wrapping structure for the first sensing component 320 to improve positioning accuracy of the first sensing component 320, and better protect the first sensing component 320. The first mounting portion 3125 is disposed corresponding to the first sensor 210. Based on such structural configuration, the first rocker 310 is an integrally formed structure, so that tolerance accumulations caused by assembling is avoided and assembly requirements are reduced, the first sensing component 320 is disposed on the first mounting portion 3125, so that relatively high position precision thereof is obtained, moreover, the joystick mechanism 10 further obtains higher control precision.

Please further refer to FIG. 2, the rocker mechanism 10 includes a reset component 700, the reset component 700 is disposed in the mounting base 100, the first rocker 310 and the second rocker 410 respectively abut against the reset component 700. The reset component 700 may be a conical spiral spring, a first end of the reset component 700 abuts against the mounting base 100, and a second end of the reset component 700 directly abuts against the first rocker 310 and the second rocker 410, or abuts against the first rocker 310 and the second rocker 410 through an intermediate element. After the first rocker 310 and/or the second rocker 410 is driven to swing by the main shaft 500, the reset component 700 compresses and deforms to accumulate elastic potential energy, after the main shaft 500 is not controlled, the reset component 700 resets the main shaft 500, the first rocker assembly 300, and the second rocker assembly 400. The conical spiral spring further has an effect of maintaining alignment, so that the main shaft 500 is capable of returning to a center position after being deflected.

The main shaft 500 is capable of abutting the supporting plate 3123 against the circuit board 200 after being pressed to limit a swing range of the first rocker 310. Specifically, an end of the supporting plate 3123 close to the first sensor 210 is process to be arc-shaped. When the rod cap 610 is not pressed, due to a supporting effect of the reset component 700, there is a gap caused between the end of the supporting plate 3123 close to the first sensor 210 and the mounting base 100, that is, the first rocker assembly 300 is hung in the mounting base 100. When the rod cap 610 is pressed, the end of the supporting plate 3123 close to the first sensor 210 abuts against the circuit board 200 or the mounting base 100 for supporting using the circuit board 200 or the mounting base 100, and the end of the supporting plate 3123 which is arc-shaped further limits the swing range of the first rocker 310.

Figure 4:
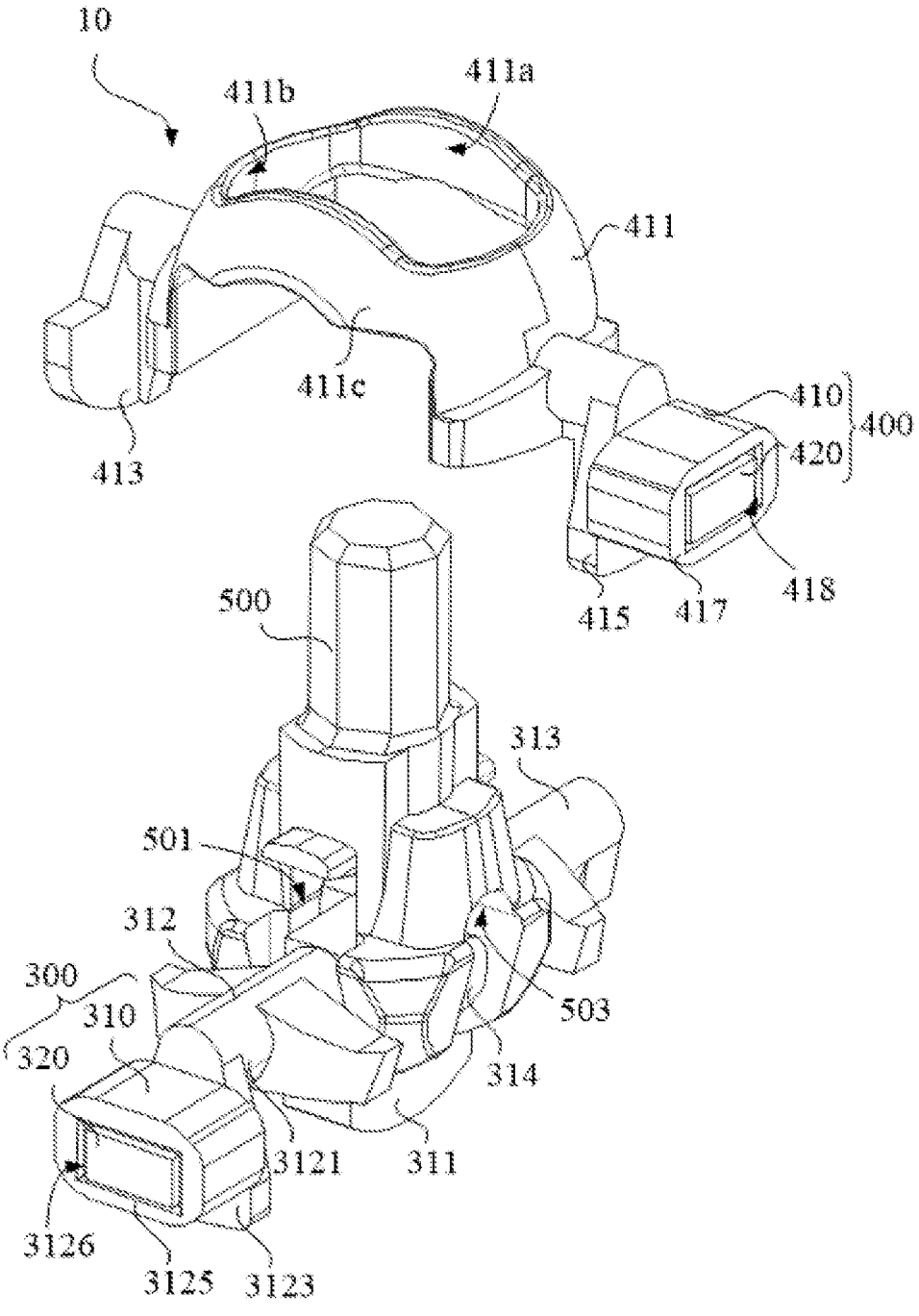
FIG. 4 is an exploded schematic diagram of a main shaft, a first rocker mechanism, and a second rocker mechanism of the joystick mechanism shown in FIG. 3.

Please further refer to FIGS. 2 and 4, the second rocker 410 includes a main body 411, a first supporting portion 413, a second supporting portion 415, and a second mounting portion 417. The main body 411, the first supporting portion 413, the second supporting portion 415, and the second mounting portion 417 are integrally formed. The first supporting portion 413 and the second supporting portion 415 are respectively connected to two opposite ends of the main body 411 along the second direction, the second mounting portion 417 is connected to an end, away from the main body 411, of the second supporting portion 415, and is disposed corresponding to the second sensor 220, the main body 411 is sleeved on the main shaft 500, and the main shaft 500 drives the main body 411 to swing, so as to drive the second mounting portion 417 to swing with respect to the second sensor 220. The second mounting portion 417 defines a second mounting groove 418 for accommodating the second sensing component 420, the second mounting portion 417 forms a semi-wrapping structure for the second sensing component 420 to improve positioning accuracy of the second sensing component 420, and better protect the second sensing component 420. Based on such structural configuration, the second rocker 410 is an integrally formed structure, so that tolerance accumulations caused by assembling is avoided and assembly requirements are reduced, the second sensing component 420 is disposed on the second mounting portion 417, so that relatively high position precision thereof is obtained, moreover, the joystick mechanism 10 further obtains higher control precision.

Based on above, in the process of operating the gamepad by the users, when a direction of a torque applied to the main body 411 through the rod cap 610 and the main shaft 500 is along the second direction, the main shaft 500 rotates around the second direction with respect to the first rotating shaft 314 and the second rotating shaft 315, the first limiting groove 501 defines the first limiting space, and at this time, the first sensing component 320 and the first sensor 210 remain relatively stationary, so that there is no control signal generated in the first direction; when the main shaft 500 drives the second rocker 410 to swing around the second direction, so as to drive the second sensing component 420 to synchronously swing around the second direction to move with respect to the second sensor 220 to generate control signals in the second direction.

The main body 411 defines a through hole 411a for the main shaft 500 to pass through, and the through hole 411a forms two notches 411b for limiting the main shaft 500 in the second direction. When the torque applied to the main body 411 through the rod cap 610 and the main shaft 500 is along the first direction, the main shaft 500 rotates around the first direction with respect to the mounting base 100, and the two notches 411b define a second limiting space, and at this time, the second sensing component 420 and the second sensor 220 remain relatively stationary, so that there is no control signal generated in the second direction; when the main shaft 500 drives the first rocker 310 to swing around the first direction, so as to drive the first sensing component 320 to synchronously swing around the first direction to move with respect to the first sensor 210 to generate the control signals in the first direction.

In other words, based on above cooperation structures of the main shaft 500, the first rocker assembly 300, and the second rocker assembly 400, controls on the first direction and controls on the second direction are independent, so as to achieve control accuracy.

Please further refer to FIG. 4, the main body 411 includes a spherical fitting surface 411c, the spherical fitting surface 411c is located at a side, facing away from the first rocker 310, of the main body 411. The mounting base 100 defines a spherical groove (not shown in the drawings), and the spherical fitting surface 411c is slidably engaged in the spherical groove. In other words, the main body 411 and the mounting base 100 provide a spherical joint effect, so as to obtain a large motion range and ensure motion stability of the joystick mechanism 10.

Please further refer to FIG. 2, the mounting base 100 includes an upper housing 110 and a lower housing 120, the spherical groove is defined on the upper housing 110, protrusions 111 are disposed on peripheral sides of one of the upper housing 110 and the lower housing 120, and clamping grooves 121 are defined on another one of the upper housing 110 and the lower housing 120, the protrusions 111 are respectively clamped in the clamping grooves 121. In other words, in the embodiment, the upper housing 110 and the lower housing 120 are transversely pressed, so that the upper housing 110 and the lower housing 120 are avoided from stamping up and down, that is, the upper housing 110 and the lower housing 120 are avoided from stamping along a direction of the main shaft 500, thereby avoiding deformation of plastic components caused by the stamping to reduce a product yield.

The joystick mechanism 10 as foregoing is applied to the gamepad, the joystick mechanism 10 includes the mounting base 100, the circuit board 200, the first rocker assembly 300, and the second rocker assembly 400. The circuit board 200 is disposed in the mounting base 100, and the circuit board 200 includes the first sensor 210 and the second sensor 220. The first rocker assembly 300 includes the first rocker 310 and the first sensing component 320, the first rocker 310 is disposed in the mounting base 100, the first sensing component 320 is connected to the first rocker 310 and is disposed corresponding to the first sensor 210, and the first rocker assembly 300 is capable of swinging around the first direction to drive the first sensing component 320 to swing with respect to the first sensor 210. The second rocker assembly 400 includes the second rocker 410 and the second sensing component 420, the second rocker 410 is disposed in the mounting base 100, the second sensing component 420 is connected to the second rocker 410 and is disposed corresponding to the second sensor 220, the second rocker assembly 400 is capable of swinging around the second direction to drive the second sensing component 420 to swing with respect to the second sensor 220, the second direction is perpendicular to the first direction. The first sensing component 320 is directly connected to the first rocker 310 and is driven by the first rocker 310 to swing with respect to the first sensor 210, the second sensing component 420 is directly connected to the second rocker 410 and being driven by the second rocker 410 to swing with respect to the second sensor 220, there is no intermediate component required for both connection between the first sensing component 320 and the first rocker 310 and connection between the second sensing component 420 and the second rocker 410, so that an intermediate link of assembling the first sensing component and the first rocker and an intermediate link of assembling the second sensing component and the second rocker are simplified, and positioning accuracy and a product yield thereof are further improved.

Technical features of above embodiments may be combined arbitrarily, in order to simplify the description, all possible combinations of the technical features in the above embodiments are yet not described, however, as long as combinations of these technical features do not conflict, it should be considered that the combinations of these technical features fall within a protection scope of the present disclosure.

The above embodiments only express several embodiments of the present disclosure, and the description of the embodiments is relatively specific and detailed, but cannot be understood as a limitation for the protection scope of the present disclosure. It should be noted that, for those who skilled in the art, several variations and improvements may be made without departing from a concept of the present disclosure, and are all within the protection scope of the present disclosure. Therefore, the protections cope of the present disclosure shall be subject to the claims.

What is claimed is:

1. A joystick mechanism, comprising:
a mounting base;
a circuit board;
a first rocker assembly;
a second rocker assembly; and
a main shaft;
wherein the circuit board is disposed in the mounting base, and the circuit board comprises a first sensor and a second sensor; the first rocker assembly comprises a first rocker and a first sensing component, the first rocker is disposed in the mounting base, the first sensing component is connected to the first rocker and is disposed corresponding to the first sensor, and the first rocker assembly is capable of swinging around a first direction to drive the first sensing component to swing with respect to the first sensor; the second rocker assembly comprises a second rocker and a second sensing component, the second rocker is disposed in the mounting base, the second sensing component is connected to the second rocker and is disposed corresponding to the second sensor, the second rocker assembly is capable of swinging around a second direction to drive the second sensing component to swing with respect to the second sensor, the second direction is perpendicular to the first direction;

wherein the main shaft is disposed in the mounting base, the first rocker passes through the main shaft and is rotatably engaged in the main shaft in the second direction, the second rocker is sleeved on the main shaft, the main shaft is configured to drive the first rocker and the second rocker to swing;

wherein the main shaft defines a first limiting groove along the first direction and defines a second limiting groove along the second direction; the first rocker comprises a limiting portion, a first extending portion, a second extending portion, a first rotating shaft, and a second rotating shaft; the limiting portion, the first extending portion, the second extending portion, the first rotating shaft, and the second rotating shaft are integrally formed, the first extending portion and the second extending portion are respectively connected to two opposite ends of the limiting portion along the first direction, the first rotating shaft and the second rotating shaft are respectively connected to another two opposite ends of the limiting portion along the second direction; the first rotating shaft and the second rotating shaft are respectively rotatably engaged in the second limiting groove in the second direction, the limiting portion passes through the first limiting groove and is driven by the main shaft to swing around the first direction; the first sensing component is connected to an end, away from the limiting portion, of the first extending portion.

2. The joystick mechanism according to claim 1, wherein the first extending portion comprises a shaft portion, a supporting plate, and a first mounting portion, the shaft portion is connected to the limiting portion, the supporting plate is located between the shaft portion and the first mounting portion, the first mounting portion defines a first mounting groove for accommodating the first sensing component, and the first mounting portion is disposed corresponding to the first sensing component; the main shaft is capable of abutting the supporting plate against the circuit board after being pressed to limit a swing range of the first rocker.

3. The joystick mechanism according to claim 1, wherein the second rocker comprises a main body, a first supporting portion, a second supporting portion, and a second mounting portion; the main body, the first supporting portion, the second supporting portion, and the second mounting portion are integrally formed; the first supporting portion and the second supporting portion are respectively connected to two opposite ends of the main body along the second direction, the second mounting portion is connected to an end, away from the main body, of the second supporting portion, and is disposed corresponding to the second sensor, the main body is sleeved on the main shaft, and the main shaft drives the main body to swing, so as to drive the second mounting portion to swing with respect to the second sensor; the second mounting portion defines a second mounting groove for accommodating the second sensing component.

4. The joystick mechanism according to claim 3, wherein the main body defines a through hole for the main shaft to pass through, and the through hole forms two notches for limiting the main shaft in the second direction.

5. The joystick mechanism according to claim 3, wherein the main body comprises a spherical fitting surface, the spherical fitting surface is located at a side, facing away from the first rocker, of the main body; the mounting base defines a spherical groove, and the spherical fitting surface is slidably engaged in the spherical groove.

6. The joystick mechanism according to claim 1, wherein the mounting base comprises an upper housing and a lower housing, protrusions are disposed on peripheral sides of one of the upper housing and the lower housing, and clamping grooves are defined on another one of the upper housing and the lower housing, the protrusions are respectively clamped in the clamping grooves.

7. The joystick mechanism according to claim 1, wherein the rocker mechanism comprises a reset component, the reset component is disposed in the mounting base, the first rocker and the second rocker respectively abut against the reset component.

8. A gamepad, comprising:
an outer housing; and
a joystick mechanism according to claim 1;
wherein the joystick mechanism is connected to the outer housing.

\* \* \* \* \*